United States Patent [19]
Edling et al.

[11] Patent Number: 5,408,990
[45] Date of Patent: Apr. 25, 1995

[54] SOLAR ENERGY COLLECTION PANEL ASSEMBLY

[76] Inventors: Jack V. Edling, 2116 Camino Dr., Escondido, Calif. 92026; John G. Freeberg, P.O. Box 1131, Rancho Sante Fe, Calif. 92067; Colin G. Harris, 1821 Ivy Rd., Oceanside, Calif. 92054; Richard L. Stover, 47 Green River Rd., Alford, Mass. 01230

[21] Appl. No.: 240,441

[22] Filed: May 10, 1994

[51] Int. Cl.⁶ ............................................. F24J 2/08
[52] U.S. Cl. ........................................ 126/683; 126/700
[58] Field of Search ......................... 126/683, 698, 700

[56] References Cited
U.S. PATENT DOCUMENTS 4,069,812  1/1978  O'Neill .................................. 126/700
4,307,710  12/1981  Natter ................................... 126/700

*Primary Examiner*—Carroll B. Dority
*Attorney, Agent, or Firm*—Gillian, Duncan, Harms

[57] ABSTRACT

A solar energy collection panel assembly particularly adapted for use in a sun tracking system. The assembly is made up of several elongated components that have uniform cross sections and are preferably formed by extrusion. Interlocking base members have upwardly directed channels which hold tubes partially surrounded by thermal insulation material. Lens support assemblies having a generally isosceles triangular cross section with the triangle bases secured to the base members with the triangle sides oriented to direct light entering between apexes toward the tubes. Grooves at each pair or apexes receive the edges of an elongated, uniform cross section, compound, concentrating, cylindrical lens to attach the lens to the assembly. The lenses focus incident light on the tubes. Right triangular edge lens support members provide square edges to the assembly. A structural strong and rigid housing is preferably used to receive, support and strengthen the assembly.

13 Claims, 3 Drawing Sheets

SOLAR ENERGY COLLECTION PANEL ASSEMBLY

BACKGROUND OF THE INVENTION

This invention relates in general to apparatus for collecting solar energy for use and, more particularly, to a solar energy collection panel in which solar energy is collected and directed to an energy absorbing tube.

A wide variety of solar energy collectors have been developed for heating fluids such as water, generating electricity, etc. Some are simple and passive, basically simply using a black plastic tube exposed to sunlight through which water is circulated to heat a swimming pool or the like. Photovoltaic panels convert sunlight energy directly into electrical energy. Others include mechanisms for moving a collector panel to track the sun, either manually or automatically, to improve collection efficiency. For heating water or other fluids, the sun tracking systems tend to have the highest efficiency.

Typical of prior sun tracking solar energy tracking systems are those described by Doundoulakis in U.S. Pat. No. 4,307,711 and Rogers in U.S. Pat. No. 3,929,121. In such collectors, a plurality of condensing lenses, which may be fresnel lenses, are focussed on spots on collector elements, such as fluid carrying tubes. The lenses and tubes are mounted in frames that are movable to keep the lens system pointed at the sun. The lens systems for focussing sunlight on small spots are complex and expensive to manufacture and are difficult to maintain precisely in focus on the collecting medium.

Other systems use concave mirrors of complex optical design, typically mounted on poles, for focussing sunlight on a centrally located receiver, such as is described by Clark in U.S. Pat. No. 4,192,289. Typically, these systems are used to boil a fluid, such as water, that is then passed to a steam powered electrical generator. These systems are large and complex. Maintaining alignment between the mirrors and the receiver is difficult.

Both the lens and mirror systems require a sun tracking system, such as those described by Smith in U.S. Pat. No. 4,179,612 and Hammons in U.S. Pat. No. 4,225,781. Difficulty is often encountered in maintaining accurate tracking and preventing flexing and distortion of the collection system during movement of large lens or mirror arrays.

Many solar energy collecting systems lose a large portion of the energy received to the atmosphere or support structures. Some lose energy almost as fast as it is collected. Complex and heavy thermal insulation systems are sometimes resorted to limit energy losses. These increase the cost of the system, make distortion of collector panels more likely and require heavy, sturdy tracking systems.

In order to provide the required rigidity and strength, many systems are very heavy and require on-site assembly from many different components. These intricate systems have continuing maintenance problems and are difficult to disassemble, even partially, for maintenance. Prior systems also have been susceptible to damage from severe weather conditions, vandalism, etc. and are difficult to repair or replace.

Thus, there is a continuing need for improved solar energy collection systems that are inexpensive, sturdy and simple to assemble, and which provide improved energy conversion through improved energy transfer efficiency and lower heat losses in the system.

SUMMARY OF THE INVENTION

The above-noted problems, and others, are overcome in accordance with this invention by a solar energy collection panel assembly, which basically comprises a base assembly made up of plural elongated, identical, uniform cross section base members, energy receiving tubes positioned in longitudinal channels in the base members, surrounded by thermal insulation material except in the energy receiving area, a combination lens support and reflector assembly that is secured to the base members and provides reflective surfaces oriented to direct sunlight to the tube and an elongated, uniform cross section, compound, concentrating, cylindrical lens secured to the reflector assembly in a manner causing incident solar radiation to be focussed along a line on said tube.

The base members are secured together by opposed, aligned slots in adjacent base members and a connector strip that fits in the slots to hold adjacent base members together and in alignment.

The lens holding members preferably have uniform, generally isosceles triangular cross sections, with the triangle base secured to the base members by cooperating ridge and groove means. The sides of the triangles are preferably highly reflective. When in place on the base members, the sides of the triangle are oriented so that any solar energy entering between the adjacent triangle apexes that strikes the sides will be reflected toward an adjacent tube. The elongated compound, concentrating, cylindrical lens preferably has substantially parallel side edges that fit into and are retained by grooves at the triangle apexes.

The tubes are connected to any suitable manifold at the ends of the assembly to transport the heated fluid in the tubes to a work producing location and for returning cooled fluid to the opposite ends of the tubes. Typically, the manifolds extend across the ends of the tubes at each end of panel, connected to the tubes with "T" fittings, the manifold tubes running along housings at the ends of the panels to flexible connectors to direct the heated fluid to the work producing station.

The long edges of the assembly are preferably finished by an edge triangular lens support member having a side toward the assembly matching the sides of the lens holding members and a side at the assembly edge lying substantially perpendicular to the plane of the assembly to give a squared-off edge configuration.

For optimum assembly strength and rigidity, especially where the assembly is used with a solar tracking system and is moved to maintain the desired orientation toward the sun, the assembly is preferably housed in a tray-like housing having a sturdy bottom surface for supporting the assembly and upstanding sides in contact with the assembly edges.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
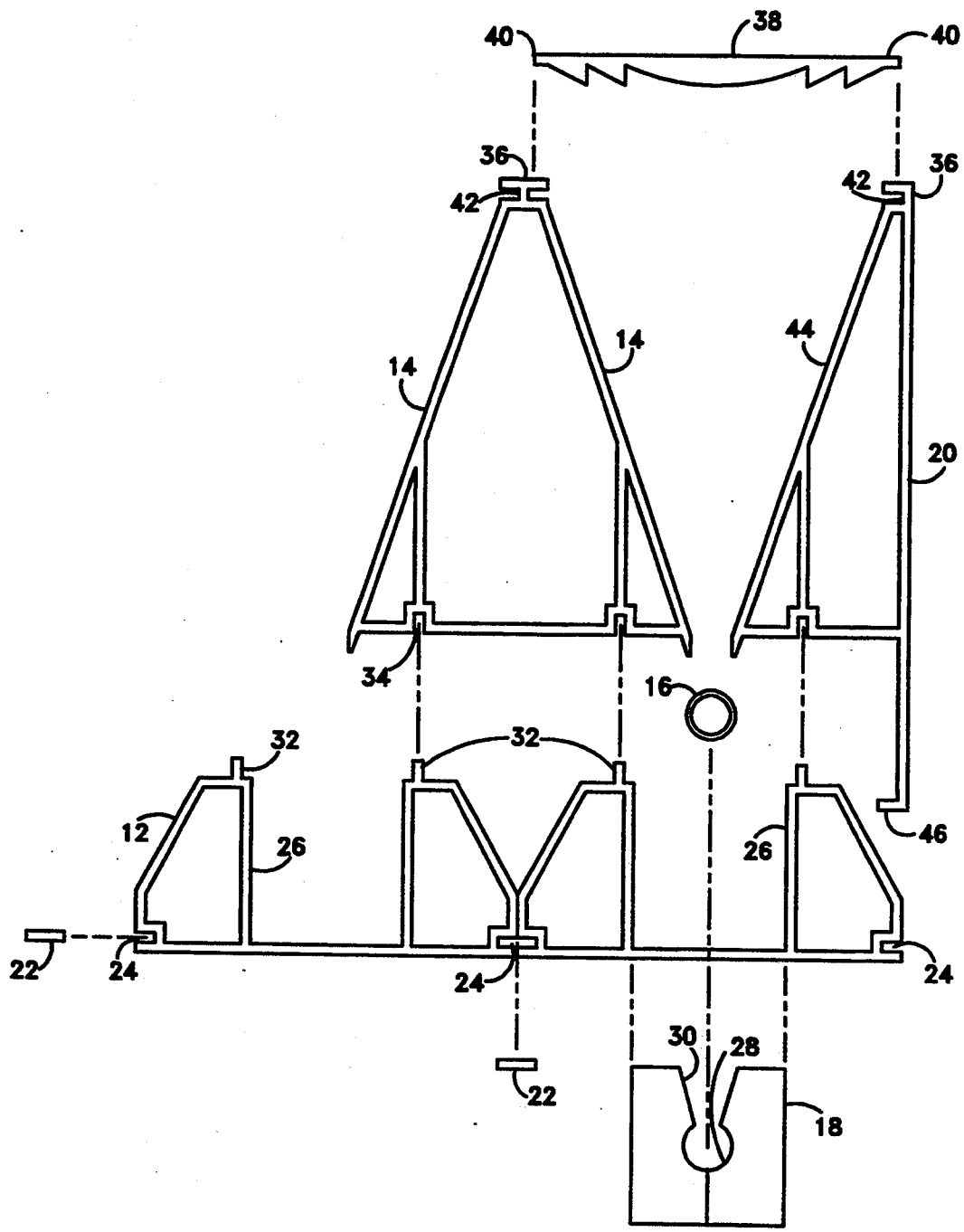
FIG. 1 is an exploded end elevation view of a portion of a solar energy collection panel according to this invention, showing the individual components.
Figure 2:
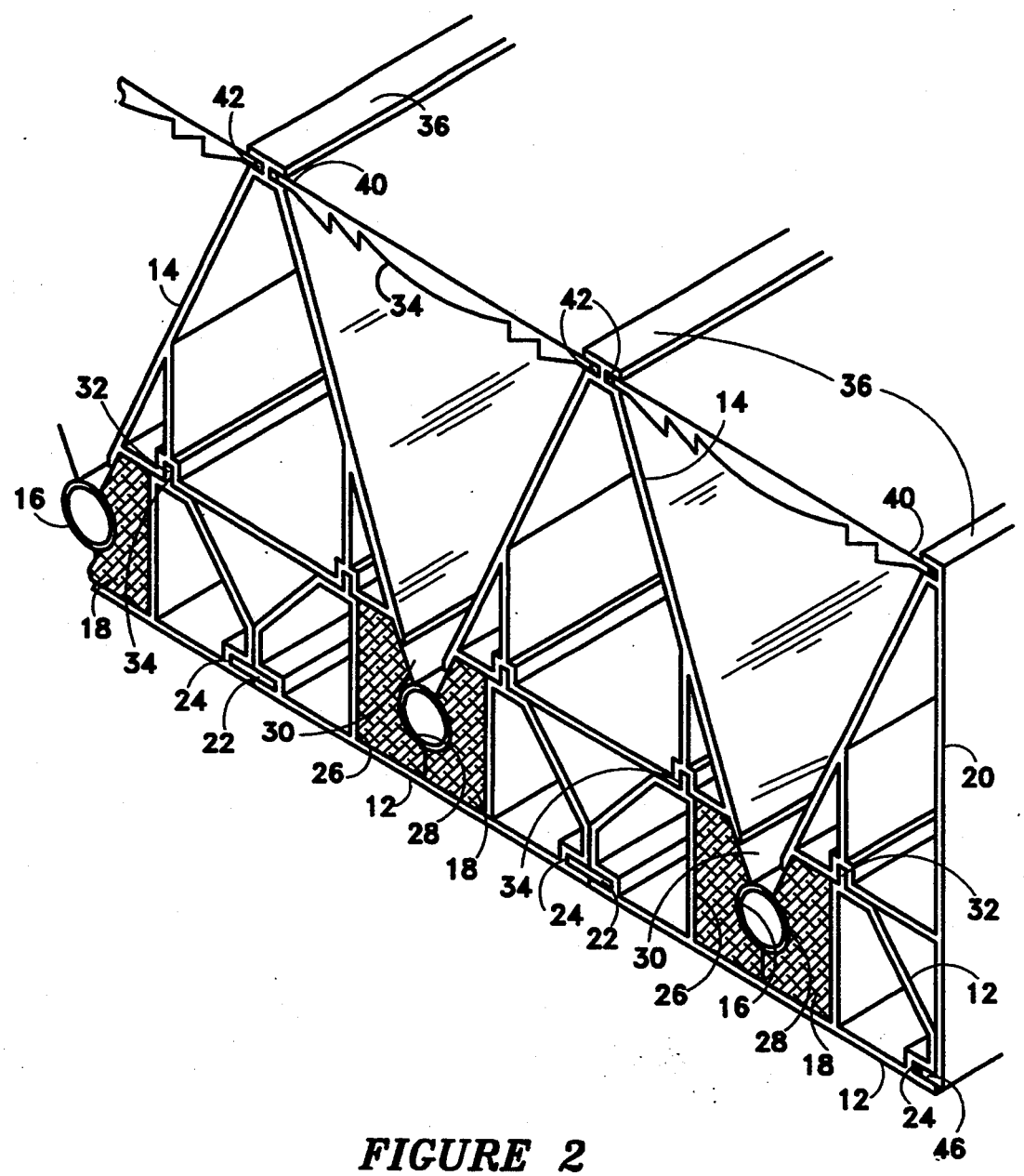
FIG. 2 is a perspective view of the component of FIG. 1 fully assembled.

Referring to FIGS. 1 and 2, there is seen a solar energy collection panel 10. Panels 10 are quite simple, being made up of base members 12, lens holding members 14, tubes 16, insulation 18, end members 20 and connecting strips 22.

The base members 12 are all identical and have uniform cross sections along their lengths. While base members 12 can be formed by any suitable method, extrusion is preferred. Adjacent base members 12 are connected together by connector strips 22 pressed into slots 24 in the sides of base members 12. Tolerances are selected to allow for heat expansion, providing a snug fit when the panel is heated during normal operation. Each of base members 12 includes a large, central, longitudinal channel 26 into which thermal insulation material 18 is placed. Insulation material 18 has a central cavity 28 for receiving and supporting tube 16. Where insulation material 18 is in the form of blocks, two separable pieces are preferred, as shown, to make insertion and removal of tube 16 convenient. Insulation preferably substantially fills channels 26 for maximum heat retention affects while preserving a channel 30 through which sunlight can reach tube 16, as detailed below. Any suitable insulation material may be used. Typical insulation materials include high temperature resistant closed cell foam materials, and high temperature resistant fibers. Typical fibers included glass fibers, preferred for temperatures up to about 500° F., mineral wool, preferred for temperatures up to about 1400° F. and ceramic fibers, preferred for temperatures up to about 3500° F.

Lens support members 14 have a uniform cross section, preferably a generally isosceles triangular configuration, as shown. While any suitable manufacturing method may be used, extrusion is preferred for low cost and effective production of elongated uniform cross-sectional shapes. Lens support members 14 are secured to base members 12 by longitudinal cooperating ridges 32 and grooves 34. The cooperating ridges and grooves provide horizontal stability while vertical stability is secured by an external frame as described below. Lens support members are oriented so that stray sunlight entering between the adjacent apexes 36 will be reflected toward and to the exposed upper surface of tubes 16. The reflecting surfaces are preferably highly polished for maximum efficiency. Generally, no reflective coating is required, since the angle of the walls is generally well beyond the critical angle for maximum reflection.

At the longitudinal edges of panel 10 it is preferred that a slightly modified edge support member 44 be used to secure the sides to the panel 10. This member is identical with members 14, except that one side 46 of the member is perpendicular to the overall plane of the panel and extends down the side of the panel to an inwardly directed ridge 46 which enters the outermost slot 24 in edge base member 12. This finishes the edge of the panel and cooperates well with the housing shown in FIG. 3, as described below.

An elongated compound, concentrating, cylindrical lens 38 having substantially parallel edges 40 is supported by inserting edges 40 into grooves 42 at the apexes 36 of lens support members 14 to attach the lenses to the lens support members. The focal length of lens 38 and the height of lens support members 14 are selected so that light entering the lens is focussed at or just above or below the surface of tube 16. Compound, concentrating, cylindrical lens 38 has a uniform cross section along its length so that incoming sunlight is focussed along a continuous line. Preferably, lens 38 is formed by extrusion, although other molding or shaping processes may be used, if desired.

Lens 38 may be formed from any suitable transparent material. Preferably, transparent plastics such as acrylics are used. Base members 12, lens support members 14 and connector strips 22 are preferably formed from the same material for uniformity of thermal expansion characteristics. Any suitable extrudable engineered plastic, polymer, metal, etc could be used.

Figure 3:
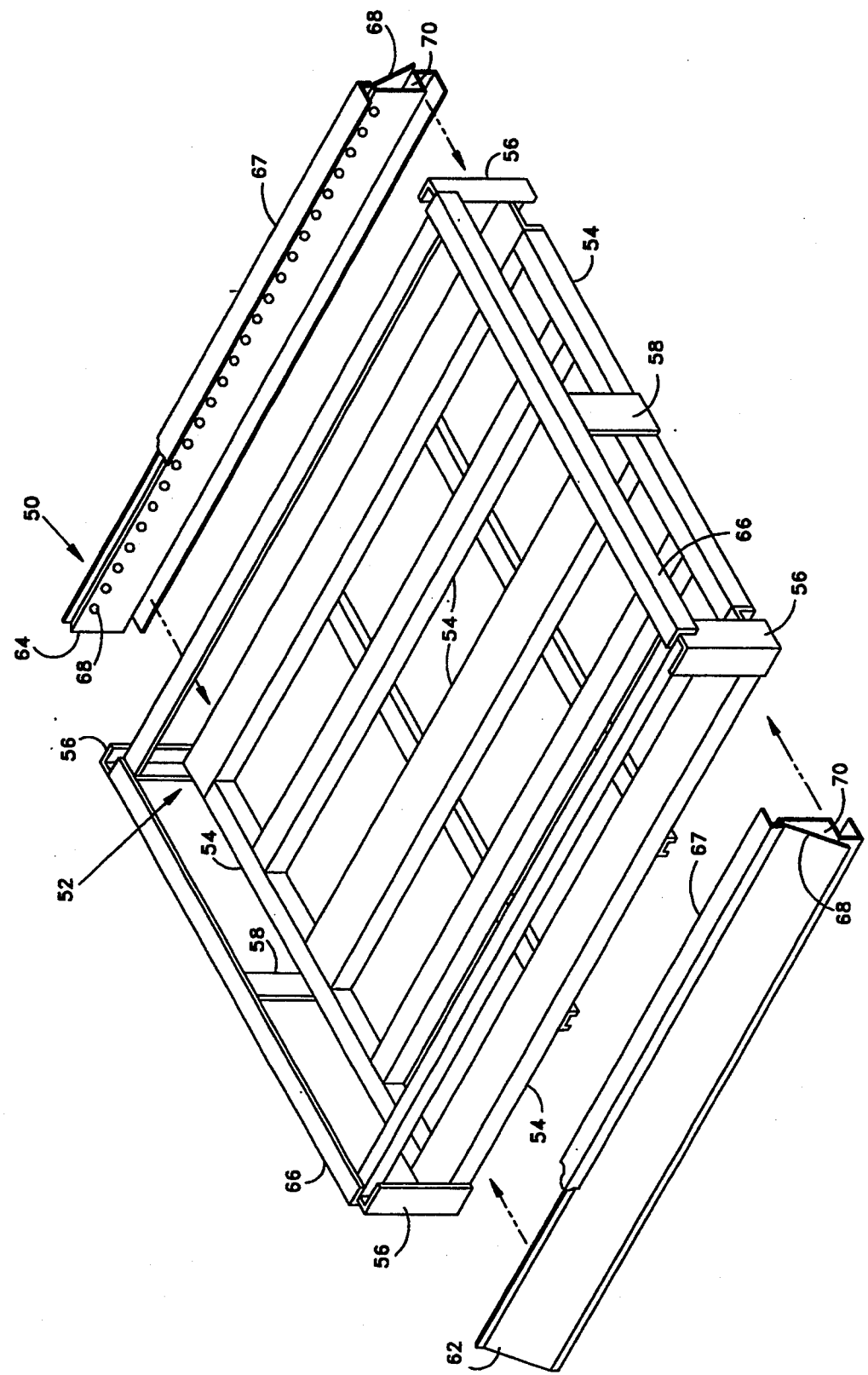
FIG. 3 is a perspective view, partially exploded, of a housing for the solar energy collection panel.

FIG. 3 is an exploded perspective view of one embodiment of a housing for holding the panel of FIGS. 1 and 2 and supplying additional strength and rigidity when the panel is used in a sun tracking system.

Housing 50 includes a floor 52 typically made up of a plurality of steel or aluminum channel sections 54 welded or otherwise fastened into a sturdy structure. Angle 56 at one end is bolted and angle 56 at the other end is welded to floor 52 at the ends, opening to the inside. A plurality of bars 58 are welded along the sides of floor 52. End panel 62 is welded and end panel 64 is removably secured to the ends of housing 50, such as by screws or bolts.

In use, a solar energy collection panel as shown in FIG. 2 is placed on floor 52 through the upper end of housing 50 with the sides of the solar energy collection panel 10 closely adjacent to bars 58. Angles 66 are secured to bars 58 and end angles 56 overlapping the upper side edges of the housed panel 10. The end panels is then fastened in place with the inner surfaces of the end panels in contact with the housed collection panel. An upper angle structure 67 is shown secured, such as with screws, along the upper edge of each end panel 62 and 64, with one end of each broken away to show the edge structure of panels 62 and 64. Each upper angle structure 67 basically has a right angle cross section, with one flange secured to panel 62 or 64 and the other extending over the edge of a panel 10 (not shown) mounted in the frame.

Ventilation ports 68 may be located at suitable points along both end panels 62 and 64. Such ports are useful in ventilating the underside of the lens and prevent air pressure buildup in the assembly.

End panel covers 68 prevent water from rain or snow entering the ventilator ports when the end panels are in place, manifold covers 70 encase insulation material (not shown) which surrounds manifold pipes running within covers 70 similar to the insulation in channels 26. Preferably, ventilation ports will communicate with the space below each lens. Inwardly extending flanges 66 cover the upper edges of the solar energy collection panel. The final assembly is strong and rigid and capable of being moved in a solar tracking arrangement without damage or distortion.

While certain preferred materials, dimensions and arrangements have been described in detail in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

I claim:

1. A solar energy collection panel assembly for a sun tracking system which comprises:
   a plurality of substantially identical elongated base members each having a substantially uniform cross section;
   means for securing said base members together;
   a longitudinal channel in each base member;
   a tube in each of said channels;
   thermal insulation material partially surrounding each of said tubes, leaving at least a portion of each tube exposed toward the open side of each channel;
   a plurality of elongated lens support members of substantially uniform cross sections secured to said base members;
   reflecting surfaces on each of said lens support members for directing light entering between adjacent members toward said tubes;
   an elongated compound, concentrating, cylindrical lens having uniform cross section and substantially parallel edges; and
   attachment means on each of said lens support members for supporting said lens edges light entering said lens focussed approximately along lines along the exposed tube surfaces.

2. The assembly according to claim 1 wherein said means for securing said base members together comprises cooperating slots in abutting base members and connector strips inserted in said slots.

3. The assembly according to claim 1 further including a structural housing for receiving and supporting said assembly.

4. The assembly according to claim 3 wherein said housing includes a rigid combination of floor, side walls and one end wall and a removable second end wall, whereby said assembly can be slid into said housing through said second end along said floor; said side and end walls having inwardly extending flanges to contact the side of said assembly opposite said floor.

5. The assembly according to claim 1 wherein said attachment means comprises slots in said lens support members for receiving said lens edges.

6. The assembly according to claim 1 wherein said lens support members are secured to said base members by cooperating ridges and grooves therebetween.

7. The assembly according to claim 1 wherein lens support members generally triangular cross sections and said attachment means are located at the apex of each triangular lens support member.

8. The assembly according to claim 1 wherein the lens support members along the sides of said assembly have approximately right triangular cross sections and all other lens support members have substantially isosceles triangular cross sections.

9. A solar energy collection panel assembly for a sun tracking system which comprises:
   a base assembly comprising:
     a plurality of substantially identical elongated base members;
     each of said base members having a substantially uniform cross section;
     a longitudinal channel in each base member; and
     cooperating slot and strip means for securing the long sides of said base members together with said channels aligned in a spaced, substantially parallel, arrangement;
   a tube assembly in each of said channels, comprising:
     a tube positioned in each of said channels substantially parallel to the length of the channel; and
     thermal insulation material partially surrounding each of said tubes with a portion of the length of each tube exposed toward the open side of the surrounding channel;
   a lens support assembly comprising:
     a plurality of lens holding members each having a uniform generally isosceles triangular configuration;
     cooperating interlocking slot and ridge means for securing the base of each triangular lens holding member to said base members;
     the sides of each triangular lens holding member oriented to direct light entering between adjacent lens holding members toward said tubes;
     grooved attachment means at the apex of each triangular lens holding member for holding the edge of a lens extending between adjacent lens holding members; and
   an elongated compound, concentrating, cylindrical lens of substantially uniform cross section having substantially parallel edges adapted to engage said grooved means.

10. The assembly according to claim 9 further including a structural housing for receiving and supporting said assembly.

11. The assembly according to claim 10 wherein said housing includes a rigid combination of floor, side walls and one end wall and a removable second end wall, whereby said assembly can be slid into said housing through said second end along said floor; said side and end walls having inwardly extending flanges to contact the side of said assembly opposite said floor.

12. The assembly according to claim 9 further including edge lens holding members each having an approximately right triangle cross section with one side substantially perpendicular to the plane of the assembly and forming the outside edge of the assembly.

13. The assembly according to claim 12 wherein the hypotenuse of each edge lens holding member is oriented in the same manner as the sides of the isosceles triangular lens holding members and includes a grooved means at the apex for holding the edge of a lens extending between an edge lens holding member and the next adjacent lens holding member.

* * * * *